US005494515A

United States Patent [19]
Young

[11] Patent Number: 5,494,515
[45] Date of Patent: *Feb. 27, 1996

[54] METHOD AND APPARATUS FOR USING BLAST-FURNACE SLAG IN CEMENT CLINKER PRODUCTION

[75] Inventor: Rom D. Young, Dallas, Tex.

[73] Assignee: Texas Industries, Inc., Dallas, Tex.

[*] Notice: The term of this patent shall not extend beyond the expiration date of Pat. No. 5,421,880.

[21] Appl. No.: 404,902

[22] Filed: Mar. 15, 1995

[51] Int. Cl.$^6$ .................................................. C04B 7/36
[52] U.S. Cl. .................... 106/756; 106/745; 106/767; 106/791; 106/792
[58] Field of Search .................... 106/745, 756, 106/767, 791, 793, 757, 758, 789, 792, 739, 735

[56] References Cited

U.S. PATENT DOCUMENTS

| | | | |
|---|---|---|---|
| 530,247 | 12/1894 | Stein | 106/789 |
| 747,919 | 12/1903 | Passow | 106/789 |
| 982,945 | 1/1911 | Forell | 106/767 |
| 998,358 | 7/1911 | Lessing | 106/767 |
| 2,600,515 | 6/1952 | Mooser | 106/767 |
| 4,054,464 | 10/1977 | Thorn, Jr. et al. | 106/767 |
| 4,174,974 | 11/1979 | Fondriest | 106/767 |
| 4,191,546 | 3/1980 | Kroyer | 65/20 |
| 5,156,676 | 10/1992 | Garrett et al. | 106/745 |
| 5,374,309 | 12/1994 | Piniecki | 106/789 |
| 5,421,880 | 6/1995 | Young | 106/767 |

FOREIGN PATENT DOCUMENTS 1167164A 7/1985 U.S.S.R. .

OTHER PUBLICATIONS

ACI Committee, "Ground Granulated Blast–Furnace Slag as a Cementitious Constiuent in Concrete", pp. 226.1R–1–226.1R–15, ACI 1987 (no month).

ASTM Committee, "Standard Specification for Ground Granulated Blast–Furnace Slag for Use in Concrete and Mortars", pp. 495–499, ASTM Jun. 1989.

Maslehuddin et al, "Corrosion of Reinforcing Steel in Concrete Containing Slag or Pozzolans", pp. 24–31, ASTM 1990 (no month).

Douglas et al., "Characterization of Ground Granulated Blast–Furnace Slags and Fly Ashes and Their Hydration in Portland Cement Blends", pp. 38–46, ASTM 1990 (no month).

Sarkar et al., "Synergistic Roles of Slag and Silica Fume in Very High Strength Concrete", pp. 32–37, ASTM 1990 (no month).

Cowan et al., "Conversion of Drilling Fluids to Cements with Blast Furnace Slag: Performance Properties and Applications for Well Cementing", pp. 277–288, Society of Petroleum Engineers (Date unknown).

"Engineering and Design Standard Practice for Concrete", 2–2–2–5 and 2–10, Department of the Army, Corps of Engineers, 5 Sep. 1985.

Primary Examiner—Mark L. Bell
Assistant Examiner—Michael Marcheschi
Attorney, Agent, or Firm—Jones, Day, Reavis & Pogue

[57] ABSTRACT

A process and apparatus by which blast-furnace slag can be added to the feedstock materials fed into the feed-end of a rotary cement kiln to form cement clinkers. The blast-furnace slag is crushed and screened to provide blast-furnace slag particles having particles with a predominant size of up to a maximum diameter of substantially 2" or less.

6 Claims, 2 Drawing Sheets

METHOD AND APPARATUS FOR USING BLAST-FURNACE SLAG IN CEMENT CLINKER PRODUCTION

BACKGROUND OF THE INVENTION

1. Field of the Invention

This invention relates in general to the manufacture of cement clinker in long rotary kilns. In particular, the invention relates to the method and apparatus for the manufacture of cement clinker in conventional long wet or dry rotary kilns wherein blast-furnace slag is added at the input-end of kiln with a stream of feedstock material containing lime such that as the stream of feedstock and blast-furnace slag moves toward the heat at the heat-end of the kiln, the blast-furnace slag is melted and defused into the feedstock material to form cement clinkers.

2. State of the Art

As stated in U.S. Pat. No. 5,156,676, the literature is replete with processes by which the calcining and clinkering of cement ingredients can be accomplished. The typical process using a rotary kiln, either wet or dry, is well known. Cement raw materials such as limestone, clay and sand, or the like, are finely ground and intimately mixed to provide a substantially homogeneous mixture at the input or feed-end of the kiln. The kiln is tipped downwardly at an angle such that the heat-end of the kiln is below the feed-end. The kiln has generally four operating zones including a precalcining zone, a calcining zone, a clinkering zone, and a cooling zone. Conventional fuel is combined with preheated air and injected into the kiln at the heat-end. Fuels such as natural gas, oil or powdered coal are conventionally employed in cement manufacturing processes.

As the finely divided cement raw materials pass into the rotating kiln at the feed-end thereof, the materials are heated from near ambient temperature to about 538° C. (1000° F.) in the precalcining zone. In this zone, the heat of the combustion gases from the calcining zone is used to raise the temperature of the raw materials. Additionally, in the kiln, chain systems or the like may be attached to the interior of the kiln and are employed to improve the efficiency of heat exchange between the gases and raw materials.

The temperature of the raw materials is increased from about 538° C. to about 1093° C. (1000° F. to about 2000° F.) as they pass through the calcining zone and in this zone $CaCO_3$ iS decomposed with the evolution of $CO_2$.

Calcined material at the temperature of about 1093° C. (2000° F.) then passes into the clinkering or burning zone where the temperature is raised to about 1500° C. (2732° F.). It is in this zone that the primary raw materials are converted into the typical cement compounds such as tricalcium silicate, dicalcium silicate, tricalcium aluminate, and tetracalcium-aluminoferrite. The cement clinkers then leave the clinkering zone where the clinkers are cooled and thereafter processed further such as by grinding.

Further, the use of ground blast-furnace slag as a cementitious material dates back to 1774. In the production of iron, the blast furnace is continuously charged from the top with iron oxide sources, fluxing stone, and fuel. Two products are obtained from the furnace: molten iron that collects in the bottom of the furnace and liquid iron blast-furnace slag floating on the pool of iron. Both are periodically tapped from the furnace at a temperature of about 1500° C. (2732° F.). The slag consists primarily of silica and alumina combined with calcium and magnesium oxides from the fluxing stone. Cementitious activity of this slag for use in mortar or concrete is determined by its composition and the rate at which the molten material is cooled when it comes from the furnace.

Further, in the production of steel, a similar process occurs wherein liquid steel slag floats on the pool of steel. Again, the steel slag consists primarily of silica and alumina combined with calcium and magnesium oxides. Disposing of both the steel slag and the blast-furnace slag poses a major disposal problem for the manufacturer thereof because of the amount of materials involved.

Both the steel slag and the blast-furnace slag is composed of particles that are very hard. The blast-furnace slag, when used, has always been in a finely powdered or granulated form, which means that a great deal of energy must be used to grind and pulverize the slag into the finely powdered form or to granulate it. Such a process is disclosed in U.S. Pat. No. 2,600,515 in which a blast-furnace slag, in a finely powdered mixture with limestone, is fed in rotary cement kilns and is introduced directly into the flame of the kiln. The slag powder is blown in at the same time and by the same channels as the fuel, namely, pulverized coal, heavy oil or gas. This process has several disadvantages. One of the most significant disadvantages is that enormous amounts of energy are required to pulverize and dry the material so that it could be blown into the furnace.

Many of the chemical compounds in steel slag and blast-furnace slag are common to cement chemical compounds and their heat of formation is already been accomplished in their respective processes. The American Concrete Institute defines blast-furnace slag as follows:

blast-furnace slag—the nonmetallic product, consisting essentially of silicates and aluminosilicates of calcium and other bases, that is developed in a molten condition simultaneously with iron in a blast furnace.
1. air-cooled blast-furnace slag is the material resulting from solidification of molten blast-furnace slag under atmospheric conditions: subsequent cooling may be accelerated by application of water to the solidified surface.
2. expanded blast-furnace slag is the lightweight, cellular material obtained by controlled processing of molten blast-furnace slag with water, or water and other agents, such as steam or compressed air, or both.
3. granulated blast-furnace slag is the glassy, granular material formed when molten blast-furnace slag is rapidly chilled, as by immersion in water.

In the present case, the term "blast-furnace slag" will be used hereafter to designate only "air-cooled blast-furnace slag" and not expanded or granulated blast-furnace slag unless otherwise stated.

These products, with the addition of CaO, can be converted to $3CaO \cdot SiO_2$ ($C_3S$), $2CaO \cdot SiO_2$ ($C_2S$), $2CaO \cdot Fe_2O_3$($C_2F$), $4CaO \cdot Al_2O_3 \cdot Fe_2O_3$($C_4AF$), $3CaO \cdot Al_2O_3$($C_3A$) in the burning zone of the rotary kiln.

Experience has shown blast-furnace slag has no deleterious effect on the operation of a cement rotary kiln. Emission of volatile materials from the rotary kiln is improved because the slag has previously been heat treated and most volatile materials have been removed, i.e. carbon dioxide, carbon, volatile organics, and the like. However, as stated in the prior art, fine grinding or comminution or pulverization of the slag is required, thus adding an expensive step to the cement-making process. Also, granulated slag is also very expensive to form.

SUMMARY OF THE INVENTION

Because it has long been recognized that many of the chemicals and chemical compounds in blast-furnace slag are common to cement making materials and because blast-furnace slag is available in large quantities, it would be advantageous to be able to use the blast-furnace slag in the cement-making process if it could be used in a much coarser state than the pulverized or granulated state now required and if it could be added to the feedstock materials being fed to the kiln at the feed-end of the kiln instead of the heat-end thereof.

The present invention provides such use of blast-furnace slat and provides a method and apparatus for utilization of various blast-furnace process slags that have been crushed and screened to provide a coarse state with a predominant particle size having diameters up to 2" with the coarse blast-furnace slag being fed into the input-end of the kiln with the feedstock materials, thereby obtaining all of the advantages of the prior art use of blast-furnace slag without the disadvantage of the requirements to provide granulation of the slag or fine grinding, pulverizing or comminution of the slag and introducing the fine blast-furnace slag into the heat-end of the kiln.

As stated previously, Applicant's experience has shown blast-furnace slag to have no deleterious effect on the operation of a cement rotary kiln. Emission of volatile materials from the rotary kiln is improved because the blast-furnace slag has previously been heat-treated and most volatile materials have been removed, i.e. carbon dioxide, carbon, volatile organics, and the like. Because of the previous history of the blast-furnace slag, the required blast-furnace slag chemistry has already been achieved during the iron making process thus conserving energy in the cement making process. Thus there are a number of advantages of the use of this slag. First, as stated earlier, no fine grinding, pulverizing or comminution of the slag is required. Large quantities of coarse slag (defined herein as blast-furnace slag having predominant particle sizes that are substantially up to 2" in diameter) can be incorporated into the cement clinker composition with only minor chemical changes to the regular material feed to the rotary kiln. Crushing and screening is required only for slag particles in excess of 2" in diameter.

Second, no drying of the slag is required. Inherent moisture normally runs 1% to 6%. In the wet process rotary kiln system, substantial moisture reduction and savings are realized. In the dry process rotary kiln system, it is not required that the blast-furnace slag be dried.

Third, no plugging of the kiln has been experienced due to mud ring or clinker buildup. In both the wet and the dry process rotary kilns, the coarse blast-furnace slag has a cleaning effect on material buildup as it moves through the kiln.

Fourth, the coarse blast-furnace slag can be utilized as part of the initial feedstock and is introduced into the kiln at the feed-end thereof. The blast-furnace slag and wet or dry feedstock may be injected into the feed-end of the rotary kiln as separate materials and may be injected together at the feed-end of the kiln without prior blending.

Fifth, only slight chemical changes in the feedstock composition are required for the normal feedstock to accommodate the blast-furnace slag. This usually means the feedstock must be richer in lime content.

Six, the coarse blast-furnace slag chemical compound structure transforms to the desired cement clinker structure during the heat treatment within the rotary kiln by diffusion.

Seventh, substantial energy savings are realized when the blast-furnace slag is utilized because of the low temperature at which the blast-furnace slag melts and because no grinding or pulverizing of the blast-furnace slag is required.

Eight, cement clinker production increases are almost proportional to the amount of blast-furnace slag utilized.

Ninth, the environmental condition of the rotary kiln process improves because of the low volatile content of the blast-furnace slag.

Tenth, recycling of the blast-furnace slag improves the environment because it provides an important use for the large quantities of blast-furnace slag available and avoids any so-called problems with disposal of the blast-furnace slag.

Eleventh, the cost of cement production is substantially reduced because of the energy savings, and the plentiful supply of low cost blast-furnace slag.

Thus, it is an object to the present invention to provide an improved method and apparatus for operating a rotary kiln for the production of cement clinker using coarse blast-furnace slag, a by-product of the iron-making processes.

It is another object to the present invention to introduce the coarse blast-furnace slag into a cement-making rotary kiln at the feed-end thereof.

It is still another object of the present invention to use coarse blast-furnace slag having predominant particle sizes that are substantially 2" in diameter or less.

Thus, the present invention relates to a method of cement clinker manufacture using an elongated rotary cement kiln having a feed-end and a heat-end, the heat-end being tilted downwardly with respect to the feed-end, the method comprising the steps of directing heat from a heat source into the heat-end of the kiln, introducing a stream of feedstock material containing lime into the feed-end of the kiln such that the stream of feedstock material moves toward the heat at the heat-end of the kiln, and adding a predetermined amount of crushed and screened blast-furnace slag to the stream of feedstock material at the feed-end of the kiln such that as the stream of feedstock material and blast-furnace slag moves toward the heat-end of the kiln, the blast-furnace slag is melted by the heat and diffused into the feedstock material to form cement clinkers.

The invention also relates to apparatus for forming cement clinkers comprising a rotary cement kiln having a feed-end and a heat-end, the heat-end being tilted downwardly with respect to the feed-end, a heat source at the heat-end for heating the interior of the rotary kiln, and conveying means for introducing a stream of feedstock material containing lime and blast-furnace slag into the feed-end of the rotary kiln such that as the stream of feedstock material and blast-furnace slag move toward the heat-end of the kiln, the blast-furnace slag is diffused by the heat into the feedstock material to form cement clinker.

BRIEF DESCRIPTION OF THE DRAWINGS

These and other more detailed objects of the present invention will be more fully disclosed in the following DETAILED DESCRIPTION OF THE DRAWINGS in which.

DETAILED DESCRIPTION OF THE DRAWINGS

Figures 1, 2:
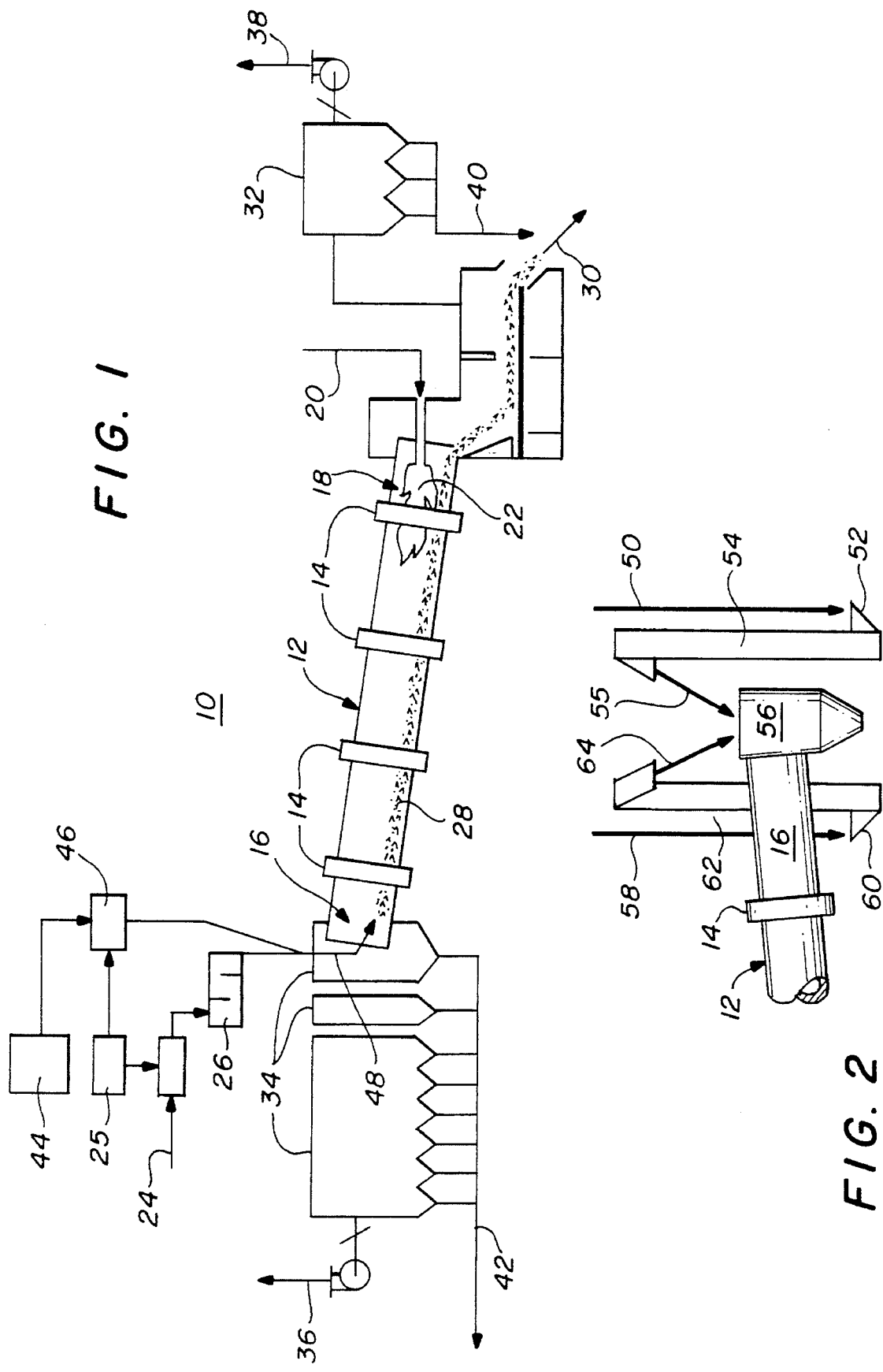
FIG. 1 is a basic diagrammatic representation of a rotary kiln system of the present invention for forming cement clinkers in which the feedstock material and the blast-furnace slag are fed together into the input-end of the rotary kilns.
FIG. 2 is a diagrammatic representation of the feedstock material and the blast-furnace slag being feed separately into the inlet-end of the rotary kiln.

The present invention allows crushed and screened raw blast-furnace slag to be added to the kiln feed as a separate component at the feed-end of the rotary cement kiln in various particle sizes wherein the predominant particle size is up to a maximum of 2" in diameter. The term "raw" blast-furnace slag, as used herein, means blast-furnace slag that is unprocessed in any manner except for crushing and screening of the blast-furnace-slag that is in a solid state. Most blast-furnace slag has particles below 2" in diameter. However, some of it is over 2" in diameter and thus a crushing and screening process is required to achieve only the desired predominant particle size that is substantially 2" in diameter or less. No fine grinding, pulverizing or comminution of blast-furnace slag is required by the present invention. The invention provides a method of utilization of various blast-furnace slags in a much coarser state than previously recognized in rotary cement kiln processes which allows the elements in the chemical compounds of the blast-furnace slag, i.e., silicates, and aluminosilicates of calcium, and the like, to become an integral part of the cement clinker. As understood by those skilled in the art, the chemistry of the slag must be understood and controlled as part of the overall ingredients of the cement and thus the quantity of the blast-furnace slag being added to the feedstock must be balanced with the feedstock materials and their chemical compounds.

In a laboratory furnace burn test of 100% blast-furnace slag, the melting point of the blast-furnace slag was determined and is the key to its use in a cement kiln. As can be seen in Table I, the melting point was determined to be 2552° F./1400° C. for blast-furnace slag which allows the blast-furnace slag to be added to the feed-end of the kiln in fairly large particle sizes, the predominant particle size being up to 2" in diameter.

TABLE I

| | | LAB FURNACE BURN | | | |
| --- | --- | --- | --- | --- | --- |
| | | | EFFECTS ON SLAG | | |
| | Temp. | Interval | None | Slightly Sticky | Melts |
| Start | 800 C. | 15 Min. | X | | |
| | 1000 C. | 15 Min. | X | | |
| | 1100 C. | 15 Min. | X | | |
| | 1200 C. | 15 Min. | X | | |
| | 1300 C. | 15 Min. | X | | |
| | 1385 C. | 15 Min. | X | | |
| | 1395 C. | 15 Min. | | X | |
| | 1400 C. | 15 Min. | | | X |

Table I illustrates the effects on blast-furnace slag when heated to various temperatures. The tests set forth in Table I were run 15 minutes at each temperature with slag size approximating 3/8" particles. As a result of the tests, it has been determined that the slag will not thicken slurry in the chain section of the rotary kiln, cause mud rings or increase dust loss because of particle size. Further, it will reduce moisture content as much as 2.2% or more depending upon the quantity of blast-furnace slag. The blast-furnace slag begins to melt and combine with other raw materials somewhere between the calcination zone and the burning zone in the rotary kiln. Because of the low melting point, it is not necessary to grind, pulverize or comminute this material such as in the prior art which requires 80% of the material to pass through a 200-mesh screen for a chemical combination with other ingredients. The formation of silicates and aluminosilicates of calcium and other bases which are similar to cement clinker compounds, if not the same, have already been accomplished in the blast-furnace slag during the steel-making process. These compounds, with the addition of CaO, can be converted to $2CaO \cdot SiO_2(C_2S)$, $3CaO \cdot SiO_2 (C_3S)$, $2CaO \cdot Fe_2O_3(C_2F)$, $3CaO \cdot Al_2O_3(C_3A)$, and $4CaO \cdot Al_2O_3 Fe_2O_3 (C_4AF)$ with very little additional heat. These are the major chemical compounds of cement clinker.

The apparatus of the present invention is illustrated in FIG. 1. The apparatus 10 includes the rotary kiln 12 supported in a well-known manner by flanges 14 that rotate with the kiln. The kiln has a feed-end 16 and a heat-end or burning zone 18. The heat-end 18 is tilted downwardly with respect to the feed-end 16 as is well known in the art. A fuel source 20 creates a flame 22 in the heat-end 18 of the rotary kiln 12 to provide a temperature of approximately 1500° C. (2732° F.). Cement raw materials or feedstock such as limestone, clay, sand and the like is carried by a variable speed conveyor belt 24 to the rotary kiln 12. If a wet slurp is used, the variable speed conveyor belt 24 will convey the feedstock to a grinder 26 and from the grinder 26 to the feed-end 16 of the rotary kiln 12. The feedstock moves in a stream 28 through the rotating kiln 12 toward the flame 22. The well-known chemical processes take place within the kiln 12 and the cement clinker 30 exits the heat-end 18 of kiln 12 for further processing. Pollution control devices 32 and 34, well known in the art, are at the heat-end and feed-end, respectively, of the kiln 12. At the heat-end 18, out of the pollution control device 32, waste gases 38 are expelled to atmosphere and reclaimed waste products 40 are recovered.

At the feed-end 16, the pollution control equipment 34 removes the waste gases 36 which are expelled and reclaims the waste products at 42.

In the present invention, the blast-furnace slag 44 is carried by a conveying device 46, such as a variable speed conveyor belt, to the feedstock material 48 that is being fed through a dust hopper 56 (FIG. 2) at the feed-end 16 of the rotary kiln 12. A controller 25 controls the speed of the conveyor belts 24 and 46 so that the proper proportion of blast-furnace slag 44 is provided relative to the feedstock depending upon the chemical compositions thereof. Such control is well known in the art and will not be discussed in detail.

FIG. 2 is a diagrammatic representation of the apparatus for providing a separate feed of the blast-furnace slag and the feedstock into the input-end of the rotary kiln 12. In FIG. 2, it can be seen that the blast-furnace slag 50 is dropped into a hopper 52 and carried upwardly by a conveying system 54 where it is deposited at 55 so as to pass through the dust hopper 56 to the input-end 16 of the rotating kiln 12. The feed of the material to the input-end of the kiln can be done in any well-known manner. In like manner, the feedstock material 58 is dropped into a hopper 60 where it is carried upwardly by conveyor means 62 and dropped at 64 into the hopper 56 for feeding into the input-end 16 of the rotary kiln 12. Either the apparatus of FIG. 1 or FIG. 2 produces the desired results.

Table II sets forth the results of the chemical analysis of a sample of blast-furnace slag taken from a blast-furnace slag stockpile at random. Of course, the chemical analysis of blast-furnace slag may vary from the values in Table II depending upon the slag.

TABLE II

BLAST-FURNACE SLAG

| ELEMENTS | BLAST-FURNACE SLAG |
|---|---|
| SiO2 | 35.76 |
| Al2O3 | 9.42 |
| Fe2O3 | 0.63 |
| CaO | 40.01 |
| MgO | 8.55 |
| SO3 | 2.70 |
| P2O5 | 0.00 |
| TiO2 | 0.00 |
| Na2O | 0.32 |
| K2O | 0.57 |

It can be seen that the blast-furnace slag composition is suitable for the manufacture of cement.

Table III illustrates the typical mix calculations for a feedstock having 0% blast-furnace slag, 89.67% limestone, 4.42% shale, 4.92% sand, and 0.99% shale.

TABLE III

TYPE I LA MIX CALCULATION - 0% SLAG

| | LS | SHALE | SAND | ORE |
|---|---|---|---|---|
| SiO2 | 8.25 | 49.25 | 90.00 | 0.81 |
| Al2O3 | 2.31 | 18.60 | 3.24 | 0.28 |
| Fe2O3 | 1.30 | 5.79 | 1.90 | 96.17 |
| CaO | 47.60 | 3.30 | 0.51 | 0.51 |
| MgO | 0.46 | 1.25 | 0.07 | 0.70 |
| SO3 | 0.90 | 3.37 | 0.13 | 0.11 |
| P2O5 | 0.00 | 0.00 | 0.00 | 0.00 |
| TiO2 | 0.00 | 0.00 | 0.00 | 0.00 |
| Na2O | 0.10 | 0.73 | 0.03 | 0.03 |
| K2O | 0.50 | 3.10 | 0.31 | 0.04 |

CLINKER ANALYSIS

| | SLURRY | CLINKER |
|---|---|---|
| SiO2 | 14.01 | 21.78 |
| Al2O3 | 3.06 | 4.75 |
| Fe2O3 | 2.46 | 3.83 |
| CaO | 42.86 | 66.62 |
| MgO | 0.48 | 0.74 |
| SO3 | 0.96 | 0.75 |
| P2O5 | 0.00 | 0.21 |
| TiO2 | 0.00 | 0.21 |
| Na2O | 0.12 | 0.19 |
| K2O | 0.60 | 0.50 |
| TOTAL | | 99.59 |
| S/R | | 2.42 |
| A/F | | 1.35 |
| C3S | | 63.33 |
| C2S | | 14.66 |
| C3A | | 7.22 |
| C4AF | | 11.65 |

Table IV illustrates a test mix calculation having 5% blast-furnace, slag, 86.11% limestone, 4.14% shale, 3.76% sand, and 0.97% mill scale.

TABLE IV

TYPE I WITH 5% BLAST FURNACE SLAG ADDED

| ELE-MENTS | MIDL. LS | SHALE | PHILLIPS SAND | MILL SCALE | B-F SLAG |
|---|---|---|---|---|---|
| SiO2 | 8.25 | 49.25 | 90.00 | 0.81 | 35.76 |
| Al2O3 | 2.31 | 18.60 | 3.24 | 0.28 | 9.42 |
| Fe2O3 | 1.30 | 5.79 | 1.90 | 96.17 | 0.63 |
| CaO | 47.60 | 3.30 | 0.51 | 0.51 | 40.01. |
| MgO | 0.46 | 1.25 | 0.07 | 0.70 | 8.55 |
| SO3 | 0.90 | 3.37 | 0.13 | 0.11 | 2.70 |
| P2O5 | 0.00 | 0.00 | 0.00 | 0.00 | 0.00 |
| TiO2 | 0.00 | 0.00 | 0.00 | 0.00 | 0.00 |
| Na2O | 0.10 | 0.73 | 0.03 | 0.03 | 0.32 |
| K2O | 0.50 | 3.10 | 0.31 | 0.04 | 0.57 |

CLINKER ANALYSIS

| | SLURRY | CLINKER |
|---|---|---|
| SiO2 | 13.19 | 21.38 |
| Al2O3 | 3.04 | 4.98 |
| Fe2O3 | 2.51 | 3.76 |
| CaO | 43.36 | 66.33 |
| MgO | 0.48 | 1.14 |
| SO3 | 0.97 | 0.70 |
| P2O5 | 0.00 | 0.22 |
| TiO2 | 0.00 | 0.22 |
| Na2O | 0.12 | 0.12 |
| K2O | 0.60 | 0.50 |
| TOTAL | | 99.47 |
| S/R | | 2.33 |
| A/F | | 1.44 |
| C3S | | 63.76 |
| C2S | | 13.20 |
| C3A | | 8.00 |
| C4AF | | 11.44 |

Table V illustrates a test mix calculation having 10% blast-furnace slag, 82.66% limestone, 2.94% shale, 3.32% sand, and 1.08% mill scale.

TABLE V

TYPE I WITH 10% BLAST-FURNACE SLAG ADDED

| ELE-MENTS | MIDL. LS | SHALE | PHILLIPS SAND | MILL SCALE | B-F SLAG |
|---|---|---|---|---|---|
| SiO2 | 8.25 | 49.25 | 90.00 | 0.81 | 35.76 |
| Al2O3 | 2.31 | 18.60 | 3.24 | 0.28 | 9.42 |
| Fe2O3 | 1.30 | 5.79 | 1.90 | 96.17 | 0.63 |
| CaO | 47.60 | 3.30 | 0.51 | 0.51 | 40.01 |
| MgO | 0.46 | 1.25 | 0.07 | 0.70 | 8.55 |
| SO3 | 0.90 | 3.37 | 0.13 | 0.11 | 2.70 |
| P2O5 | 0.00 | 0.00 | 0.00 | 0.00 | 0.00 |
| TiO2 | 0.00 | 0.00 | 0.00 | 0.00 | 0.00 |
| Na2O | 0.10 | 0.73 | 0.03 | 0.03 | 0.32 |
| K2O | 0.50 | 3.10 | 0.31 | 0.04 | 0.57 |

CLINKER ANALYSIS

| | SLURRY | CLINKER |
|---|---|---|
| SiO2 | 12.52 | 21.30 |
| Al2O3 | 2.85 | 4.98 |
| Fe2O3 | 2.61 | 3.76 |
| CaO | 43.85 | 66.09 |
| MgO | 0.47 | 1.53 |
| SO3 | 0.94 | 0.70 |
| P2O5 | 0.00 | 0.22 |
| TiO2 | 0.00 | 0.22 |
| Na2O | 0.12 | 0.24 |
| K2O | 0.57 | 0.50 |
| TOTAL | | 99.54 |
| S/R | | 2.32 |
| A/F | | 1.44 |

TABLE V-continued

TYPE I WITH 10% BLAST-FURNACE SLAG ADDED

| | |
|---|---|
| C3S | 63.39 |
| C2S | 13.25 |
| C3A | 8.00 |
| C4AF | 11.44 |

Table VI illustrates a test mix calculation having 15% blast-furnace slag, 74.22% limestone, 1.68% shale, 2.93% sand, and 1.16% mill scale.

TABLE VI

TYPE I WITH 15% BLAST-FURNACE SLAG ADDED

| ELE-MENTS | MIDL. LS | SHALE | PHILLIPS SAND | MILL SCALE | B-F SLAG |
|---|---|---|---|---|---|
| SiO2 | 8.25 | 49.25 | 90.00 | 0.81 | 35.76 |
| Al2O3 | 2.31 | 18.60 | 3.24 | 0.28 | 9.42 |
| Fe2O3 | 1.30 | 5.79 | 1.90 | 96.17 | 0.63 |
| CaO | 47.60 | 3.30 | 0.51 | 0.51 | 40.01 |
| MgO | 0.46 | 1.25 | 0.07 | 0.70 | 8.55 |
| SO3 | 0.90 | 3.37 | 0.13 | 0.11 | 2.70 |
| P2O5 | 0.00 | 0.00 | 0.00 | 0.00 | 0.00 |
| TiO2 | 0.00 | 0.00 | 0.00 | 0.00 | 0.00 |
| Na2O | 0.10 | 0.73 | 0.03 | 0.03 | 0.32 |
| K2O | 0.50 | 3.10 | 0.31 | 0.04 | 0.57 |

| CLINKER ANALYSIS | | |
|---|---|---|
| | SLURRY | CLINKER |
| SiO2 | 11.78 | 21.21 |
| Al2O3 | 2.64 | 4.96 |
| Fe2O3 | 2.71 | 3.74 |
| CaO | 44.45 | 65.81 |
| MgO | 0.47 | 1.91 |
| SO3 | 0.91 | 0.70 |
| P2O5 | 0.00 | 0.22 |
| TiO2 | 0.00 | 0.22 |
| Na2O | 0.11 | 0.24 |
| K2O | 0.54 | 0.50 |
| TOTAL | | 99.51 |
| S/R | | 2.32 |
| A/F | | 1.44 |
| C3S | | 63.09 |
| C2S | | 13.21 |
| C3A | | 7.98 |
| C4AF | | 11.38 |

Table VII illustrates a test mix calculation having 30% blast-furnace slag, 1.81% mill scale, 0.33% sand, and 67.86% limestone.

TABLE VII

TYPE I WITH 30% BLAST FURNACE SLAG ADDED

| ELEMENTS | MIDL. LS | ORE | SAND | B-F SLAG |
|---|---|---|---|---|
| SiO2 | 8.25 | 0.81 | 90.00 | 35.76 |
| Al2O3 | 2.31 | 0.28 | 3.24 | 9.42 |
| Fe2O3 | 1.30 | 96.17 | 1.90 | 0.63 |
| CaO | 47.60 | 0.51 | 0.51 | 40.01 |
| MgO | 0.46 | 0.70 | 0.07 | 8.55 |
| SO3 | 0.90 | 0.11 | 0.13 | 2.70 |
| P2O5 | 0.00 | 0.00 | 0.00 | 0.00 |
| TiO2 | 0.00 | 0.00 | 0.00 | 0.00 |
| Na2O | 0.10 | 0.03 | 0.03 | 0.32 |
| K2O | 0.50 | 0.04 | 0.31 | 0.57 |

TABLE VII-continued

TYPE I WITH 30% BLAST FURNACE SLAG ADDED

| CLINKER ANALYSIS | | |
|---|---|---|
| | SLURRY | CLINKER |
| SiO2 | 8.44 | 20.31 |
| Al2O3 | 2.26 | 5.39 |
| Fe2O3 | 3.76 | 4.46 |
| CaO | 46.16 | 64.43 |
| MgO | 0.46 | 3.09 |
| SO3 | 0.88 | 0.70 |
| P2O5 | 0.00 | 0.22 |
| TiO2 | 0.00 | 0.22 |
| Na2O | 0.10 | 0.24 |
| K2O | 0.49 | 0.50 |
| TOTAL | 62.55 | 99.57 |
| S/R | | 2.06 |
| A/F | | 1.21 |
| C3S | | 60.37 |
| C2S | | 12.75 |
| C3A | | 7.92 |
| C4AF | | 13.57 |

Clearly, Tables III, IV, V, VI, and VII confirm that the addition of blast-furnace (air-cooled) slag is suitable as the raw material for the manufacture of cement clinker.

Figure 3:
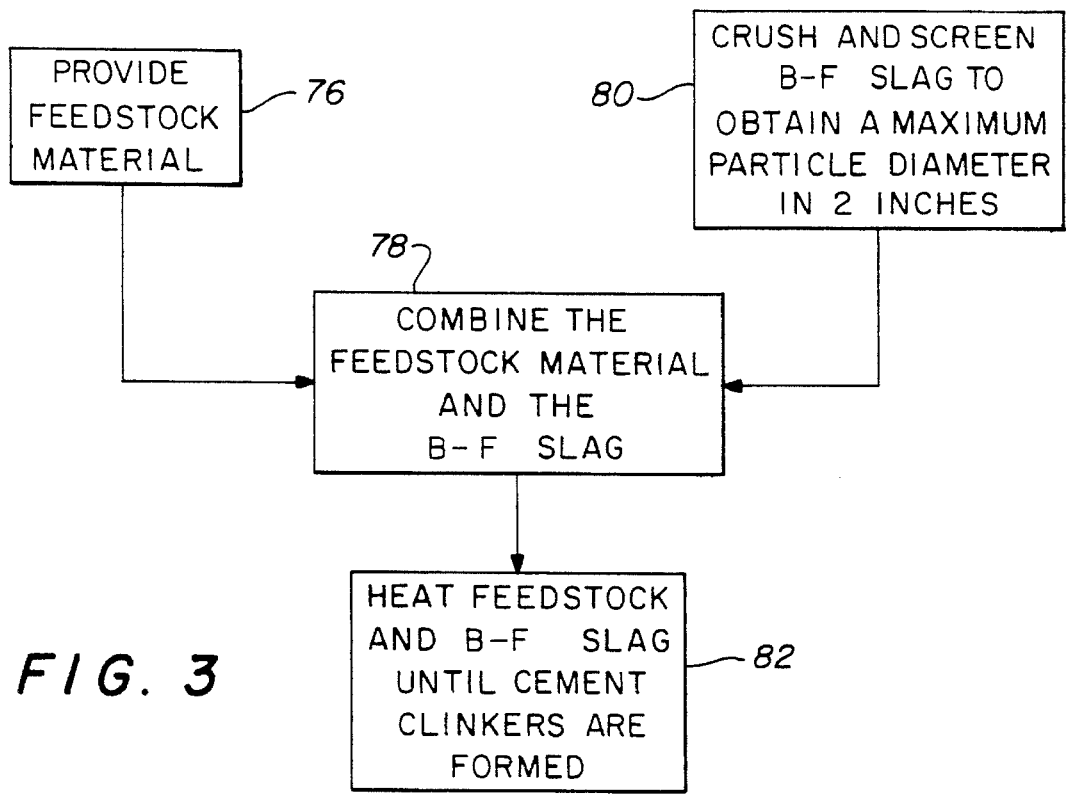
FIG. 3 is a flow chart representation of the process in which the feedstock material and the blast-furnace slag are fed into the input-end of the kiln in a combined mixture.

FIG. 3 illustrates the process of the present invention wherein the feedstock material and blast-furnace slag are combined as illustrated in FIG. 1 before entering the kiln at the feed-end thereof. At step 76, the feedstock material is provided and combined at step 78 with the blast-furnace slag that has been crushed and screened to obtain particles of which the predominant particle sizes have a maximum diameter of substantially 2 inches or less at step 80. The combined material is then fed into the feed-end of the rotary kiln at step 82.

Figure 4:
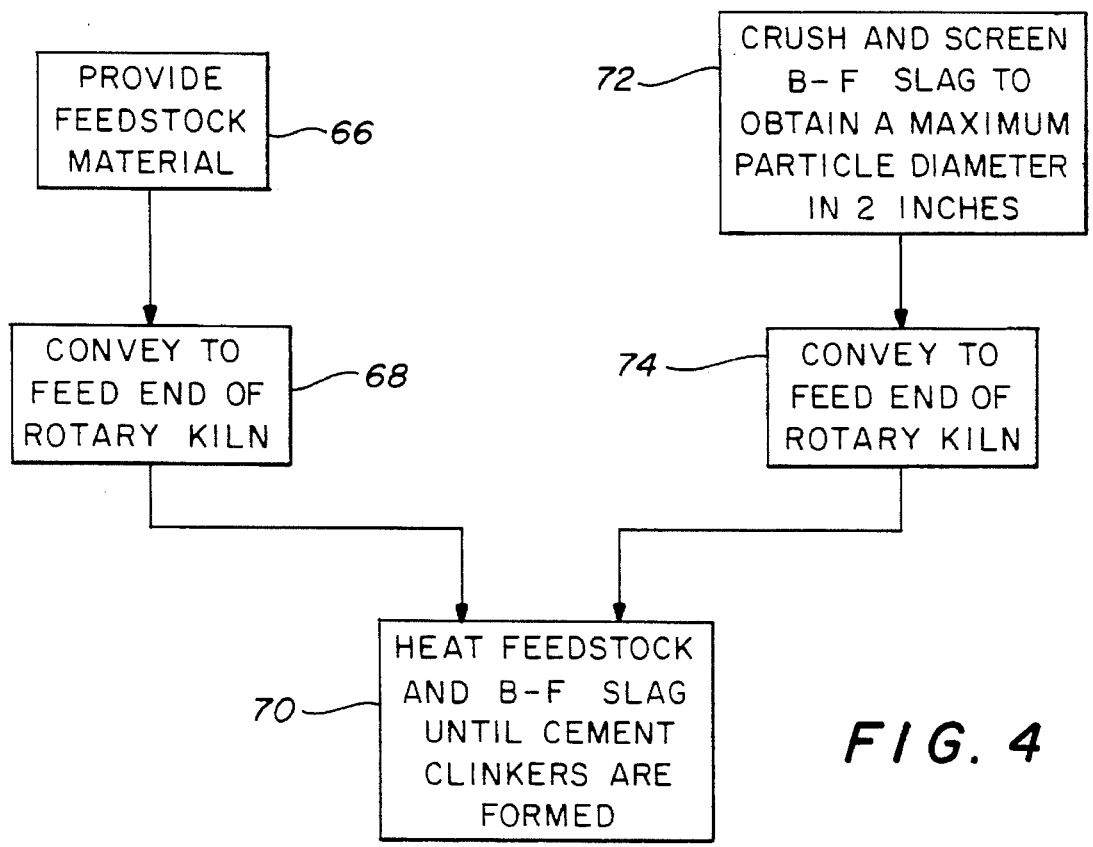
FIG. 4 is a flow chart representation of an alternate process in which the feedstock material and the blast-furnace slag are fed separately into the input or feed-end of the rotary kiln.

In FIG. 4, the process feeds the blast-furnace slag and the feedstock into the feed-end of the rotary kiln separately as illustrated in FIG. 2. In such case, at step 66 the feedstock material is provided and conveyed by a conveying means at step 68 to the inlet or feed-end of the rotary kiln. The blast-furnace slag is crushed and screened to obtain the particle sizes having a predominant particle size with a maximum diameter of substantially two inches or less at step 72 and the resultant end product is conveyed at step 74 to the inlet or feed-end of the rotary kiln. At step 70, the feedstock and blast-furnace slag is heated in the rotary kiln until cement clinker is formed.

Thus there has been disclosed a method and apparatus for forming cement clinker with the addition of coarse blast-furnace slag which is fed, with the feedstock material into the feed-end of the rotary kiln. Coarse blast-furnace slag is defined herein as blast-furnace slag that has been crushed and screened to particles having a predominant particle size up to a maximum diameter of substantially 2" in diameter. Many advantages are obtained by the present invention. No fine grinding, pulverizing or comminution of the slag is required. Large quantities of coarse slag up to the predominant 2" particle size can be incorporated into the cement clinker composition with only minor chemical changes required in the regular material fed to the rotary kiln.

No drying of the slag is required. Inherent moisture normally runs one to six percent. In the wet process rotary kiln system, substantial moisture reduction and savings are realized. In the dry process rotary kiln system, the blast-furnace slag may be dried but it is not necessary.

With the present invention, coarse blast-furnace slag can be utilized in the production of cement clinker by the way of the rotary kiln as part of the initial feedstock. The blast-furnace slag and wet (or dry) feedstock are injected into the feed-end of the rotary kiln as separate materials. They also may be injected together at the feed entrance of the kiln with prior blending. No plugging of the kiln has been experienced due to mud ring or clinker buildups. In both the wet and the dry process rotary kilns, the blast-furnace slag has a cleaning effect on material buildup as it moves through the kiln.

Only slight chemical changes are required for the normal feedstock to accommodate the blast-furnace slag. This usually means that the feedstock must be richer in lime content. The chemical compound structure of the coarse blast-furnace slag transforms to the desired cement clinker structure during the heat treatment within the rotary kiln by diffusion. Because grinding, pulverizing or comminution of the blast-furnace slag is not required, substantial energy savings are realized using this invention to produce cement clinker. Production increases are almost proportional to the amount of slag utilized. Further, the environ_mental condition of the rotary kiln process improves because of the low volatile content of the blast-furnace slag. Further, recycling of the blast-furnace slag improves the environment and provides a useful outlet for blast-furnace slag rather than the blast-furnace slag occupying vast areas of land space for storage. Thus recycling of the blast-furnace slag improves the environment and reduces the cost of cement production substantially.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

I claim:

1. A method of cement clinker manufacture using an elongated rotary cement kiln having a feed-end and a heat-end, the heat-end being tilted downwardly with respect to the feed-end, the method comprising the steps of:

directing heat from a heat source into said heat-end of the kiln;

introducing a stream of feedstock material containing limestone into said feed-end of the kiln such that the stream of feedstock material moves toward said heat at the heat-end of the kiln;

crushing and screening air-cooled blast-furnace slag to obtain particles with a predominant size of up to a maximum diameter of substantially 2"; and adding an amount of said crushed and screened air-cooled blast-furnace slag to said stream of feedstock material at said feed-end end of the kiln, such that as the stream of feedstock material and blast-furnace slag moves toward said heat-end, end, the blast-furnace slag is melted by said heat and diffused into the feedstock material to form cement clinkers.

2. A method as in claim 1 wherein the blast-furnace slag is added to the feed-end of kiln as a material separate from the feedstock material.

3. A method as in claim 1 wherein the blast-furnace slag and the feedstock material are blended prior to being introduced into the feed-end of the kiln.

4. A method as in claim 1 further including the step of using a wet process rotary kiln to receive the stream of feedstock material and blast-furnace slag.

5. A method as in claim 1 further including the step of using a dry process rotary kiln to receive the stream of feedstock material and the blast-furnace slag.

6. A method as in claim 1 wherein said blast-furnace slag has a chemical composition of silicates and aluminosilicates of calcium.

\* \* \* \* \*

(12) REEXAMINATION CERTIFICATE (4523rd)
United States Patent
Young

(10) Number: US 5,494,515 C1
(45) Certificate Issued: *Jan. 22, 2002

(54) METHOD AND APPARATUS FOR USING BLAST-FURNACE SLAG IN CEMENT CLINKER PRODUCTION

(75) Inventor: Rom D. Young, Dallas, TX (US)

(73) Assignee: Texas Industries, Inc., Dallas, TX (US)

Reexamination Request:
No. 90/005,825, Sep. 29, 2000

Reexamination Certificate for:
Patent No.: 5,494,515
Issued: Feb. 27, 1996
Appl. No.: 08/404,902
Filed: Mar. 15, 1995

( * ) Notice: This patent is subject to a terminal disclaimer.

(51) Int. Cl.$^7$ .................................................. C04B 7/36
(52) U.S. Cl. ..................... 106/756; 106/745; 106/767; 106/791; 106/792
(58) Field of Search ............................... 106/756, 745, 106/767, 791, 792

(56) References Cited

U.S. PATENT DOCUMENTS

| | | | | |
|---|---|---|---|---|
| 1,073,820 A | * | 9/1913 | Richards | |
| 1,775,313 A | * | 9/1930 | Lellep | |
| 3,017,246 A | * | 1/1962 | Kamlet | |
| 4,026,717 A | | 5/1977 | Harris et al. | 106/100 |
| 4,054,464 A | | 10/1977 | Thorn, Jr. et al. | 106/100 |
| 4,126,480 A | * | 11/1978 | MacWilliams et al. | |
| 4,174,961 A | | 11/1979 | Wolfs et al. | 75/30 |
| 4,342,598 A | | 8/1982 | Kogan | 106/100 |
| 5,156,676 A | | 10/1992 | Garrett et al. | 106/745 |
| 5,494,515 A | * | 2/1996 | Young | 106/756 |

FOREIGN PATENT DOCUMENTS

| | | |
|---|---|---|
| DE | 2829370 | 7/1978 |
| DE | 2829370 | 1/1979 |
| DE | 2833857 | 11/1980 |
| DE | 151150 | 10/1981 |
| DE | 3609568 | 9/1987 |
| DE | 3633736 | 4/1988 |
| EP | 0034690 | 9/1981 |
| EP | 0162215 | 11/1985 |
| EP | 0188618 | 7/1986 |
| EP | 0171253 | 12/1986 |
| EP | 0312323 | 4/1989 |
| EP | 0393189 | 4/1990 |
| EP | 0397862 | 4/1990 |
| EP | 0375081 | 6/1990 |
| FR | 2480136 | 10/1981 |
| FR | 2486066 | 1/1982 |
| FR | 2681592 | 3/1993 |
| GB | 2208857 | 4/1989 |
| GB | 2211182 | 6/1989 |
| JP | 13794 | 7/1967 |
| JP | 30103 | 4/1970 |
| JP | 69137 | 1/1979 |
| JP | 21420 | 7/1979 |
| JP | 21420 | 8/1979 |
| JP | 57529 | 10/1979 |
| JP | 90449 | 4/1980 |
| JP | 149359 | 5/1981 |
| JP | 223649 | 5/1983 |

(List continued on next page.)

OTHER PUBLICATIONS

P. Gooding, P.E. Halstead, "The Early History of Cement in England," Proceedings of the Third International Symposium on the Chemistry of Cement, London, 1952.

F.M. Lea, The Chemistry of Cement and Concrete, 3$^{rd}$ Ed. (no date available).

M. –Moranville–Regourd, "Cements Made From Blastfurnace Slag," Lea's Chemistry of Cement and Concrete, 4$^{th}$ Ed. (no date available).

(List continued on next page.)

*Primary Examiner*—Paul Marcantoni

(57) ABSTRACT

A process and apparatus by which blast-furnace slag can be added to the feedstock materials fed into the feed-end of a rotary cement kiln to form cement clinkers. The blast-furnace slag is crushed and screened to provide blast-furnace slag particles having particles with a predominant size of up to a maximum diameter of substantially 2" or less.

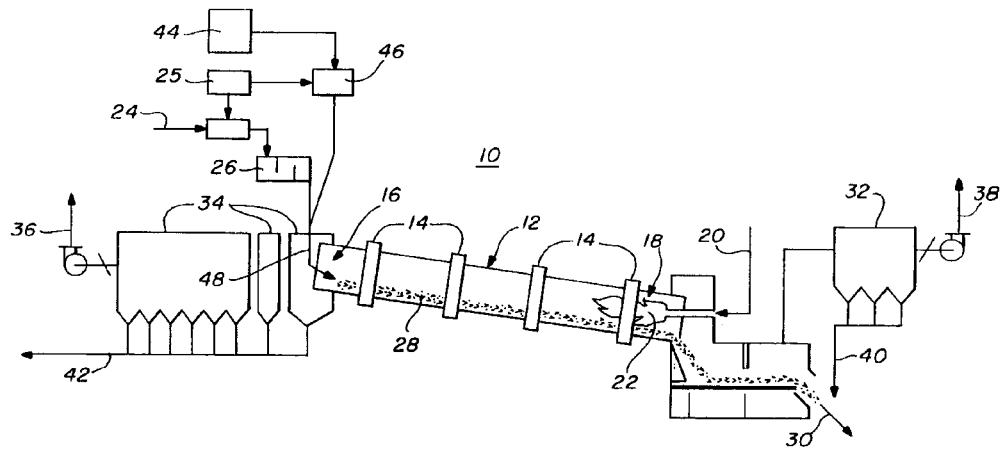

FOREIGN PATENT DOCUMENTS

| | | |
|---|---|---|
| JP | 13652 | 7/1984 |
| JP | 54948 | 5/1985 |
| JP | 192440 | 2/1990 |
| JP | 192440 | 3/1990 |
| JP | 267142 | 11/1990 |
| JP | 224147 | 10/1992 |
| PL | 139135 | 10/1987 |
| SU | 513950 | 2/1976 |
| SU | 610813 | 12/1978 |
| SU | 772394 | 10/1980 |
| SU | 658102 | 3/1981 |
| SU | 1206247 | 3/1982 |
| SU | 969692 | 6/1982 |
| SU | 1079624 | 7/1986 |
| SU | 1206247 | 7/1986 |
| SU | 1608155 | 11/1990 |
| WO | 8301443 | 4/1983 |
| WO | 8601795 | 3/1986 |
| WO | 8904815 | 6/1989 |
| WO | 9003343 | 5/1990 |
| WO | 9003344 | 5/1990 |
| WO | 9104953 | 4/1991 |

OTHER PUBLICATIONS

Dr. S.N. Ghosh, Progress in Cement and Concrete, Cement and Concrete Science & Technology, vol. I, Part I., New Delhi (no date available).

M. Regourd, "Slag and Slag Cements," Instructional Modules in Cement Science. (no date available).

Peter C. Hewlett, Lea's Chemistry of Cement and Concrete, $4^{th}$ Ed. (no date available).

Waldemar A. Klemm, Cementitious Materials: Historical Note, Materials Science of Concrete, pp. 2–26 (no date available).

W. Baoxun; F. Younghao, "Investigation on the Clinker Formation Process, Using Steel–Slag as a Raw Material," Proceedings of the 1985 Beijing International Symposium on Cement and Concrete, 1985, pp. 248–259.

D.W. Lewis, "Properties and Uses of Iron and Steel Slags," Symposium on Slag, National Institute for Transport and Road Research, South Africa, Feb. 23, 1982.

D.W. Lewis, "Resource Conservation by Use of Iron and Steel Slags," *Extending Aggregate Resources*, ASTM STP 774, American Society for Testing and Materials, 1982, pp. 31–42.

D.G. Montgomery, G. Wang, "Engineering Uses of Steel Slag—a By–Product Material." (no date available).

Wayne S. Adaska, Stewart W. Tresouthick, Presbury B. West, "Solidification and Stabilization of Wastes Using Portland Cement," Portland Cement Association, 1991.

Della M. Roy, Portland Cement: Constitution and Processing; Part 1: Cement Manufacture. (no date available).

R. Kondo, M. Daimon, S. Goto, A. Nakamura, T. Kobayashi, "Fuel Economized Ferrite Cement Made From Blastfurnace and Converter Slags," Proceedings of the Fifth Mineral Waste Utilization Symposium, Apr. 13–14, 1976.

N.I. Kogan, Yu. G. Ench, E.V. Degtyar, Ya. A. Kogan, A.I. Piven, I.I. Timchenko, "The Use of Waste Slag from the Rustavi Metallurgical Plant in Cement Industry," Proceedings of the Institute Intensifying the Process of Calcining Clinker in Rotary Kilns, No. 88, Moscow, 1986.

N.P. Kogan, O.P. Mchellov–Petrosyan, A.I. Edorov, N.F. Drepin, Intensification of the Process of Producing Cement Clinker By Calcining a Batch Consisting of Independent Starting Physicochemical Systems, Doklady akademii nauk SSSR, vol. 238, No. 2, 1978, pp. 408–410.

H.M. Javoronkov, O.P. Mtchedlov–Petrossian, N.P. Kogan, A.I. Zdorov, Y.G. Ientch, Clinkerization With Low Consumption of Energy During Firing of Mixtures Containing Unground Slag, $8^{th}$ International Congress on the Chemistry of Cement, vol. 11, 1986, pp. 1–3.

R. Kondo, M. Daimon, M. Asakawa, T. Ito, "Iron Cement Made from Blastfurnace and Converter Slags," The Cement Association of Japan, Twenty–Eighth General Meeting—Technical Session, Tokyo, May 1974.

R. Sersale, V. Amicarelli, G. Frigione, P. Uberiaco, "A Study of the Utilization of an Italian Steel Slag," 8th International Congress on the Chemistry of Cement, Rio de Janeiro, 1986.

J.J. Emery, "Slag Utilization in Pavement Construction," *Extending Aggregate Resources*, American Society for Testing and Materials, 1982.

Chart: National Slag Association, Comparison of Chemical and Physical Properties—Three Types of Steel Slag. (no date available).

George Wang, "Properties and Utilization of Steel Slag in Engineering Applications," a thesis submitted in fulfillment of requirements for Doctor of Philosophy, University of Wollongong, 1992.

"Steel Slag," User Guidelines for Waste and By–Product Materials in Pavement Construction, U.S. Department of Transportation, Publication No. FHWA RD 97–148, Apr. 1998.

W. Watson, Q.L. Craddock, "Proportioning of Raw Mixtures," *Section IX Cement Chemists' and Works Managers' Handbook*, 1962, pp. 68–75.

Portland Cements: Raw Materials and Processes of Manufacture, 1970.

S. H. Kosmatka, W. C. Panarese, Design and Control of Concrete Mixtures, Portland Cement Association Engineering Bulletin, 13th Ed., 1988.

G.W. Josephson, F. Sillers, Jr., D.G. Runner, "Iron Blast–Furnace Slag Production, Processing, Properties, and Uses," U.S. Department of the Interior, Bulletin 479, 1949.

Processed Blast Furnace Slag—The All–Purpose Construction Aggregate, National Slag Association. (no date available).

W. Gutt, P.J. Nixon, "Use of Waste Materials in the Construction Industry," Analysis of the RILEM Symposium by Correspondence, 1979, pp. 255, 278–281.

T. M. Barnes, J. M. Strong, "Use of Lime Values in Steelmaking Slag Wastes," Proceedings of the $7^{th}$ Mineral Waste Utilization Symposium, U.S. Bureau of Mines and IIT Research Institute, Chicago, 1980.

Chart: Nippon Slag Association, Utilization of Ironization of Iron and Steel Slag in Japan. (no date available).

T. Gray, "Tire Derived Fuel: An Environmentally Friendly Resource," Rubber Recycling Symposium, $74^{th}$ Annual Meeting of the Rubber Association, Toronto, Mar. 3, 1994.

J. Skalny, S. Mindess, Materials Science of Concrete II, The American Ceramic Society, Inc., 1991.

S.I. Ivanschenko, et al., Eng., "Utilizing Copper Smeltery Slag as Mineral Additive," NIITsement, Nizhnetagilsky tsementny zavod, 1979.

J. Piret, A. Dralants, "Utilizing LD–Slag for the Production of Portland Cement Clinker and Pig Iron," *Journal of Manufacture and Processing of Iron and Steel*, 16/84, 1984.

O.P. Mchedlov–Petrosyan, N.P. Kogan, A.I. Zdorov, "Coarse–Grained Slags as an Additional Constituent of the Cement Raw Mix,"Col'loque International Sur Les Laitiers et Ciments Aux Ajouts, 1981.

A.H. Fieser, "Slag and Slga Cement Practices in Japan," International Conference on Slag and Blended Cements, University of Alabama in Birmingham School of Engineering, 1982.

Slag Utilization Manual, China Steel Corp., pp. 1–10 (no date available).

J. Geiseler, "Steel Slag—Generation, Processing and Utilization," International Symposium on Research Conservation and Environmental Technologies in Mettallurgical Industries, Toronto, 1994, pp. 87–97.

B.A. Wills, Mineral Processing Technology, 4th Ed., 1988, pp. 201–212.

A.C. Broughton, "Scrap Tires: a burning issue," *Recycling Today*, Aug. 1993.

J. Grzymek, "The Combined Methods of Cement Production," The VI International Congress on the Chemistry of Cement, Moscow, Sep. 1974, pp. 3–67.

G.K. Moir, F.P. Glasser, "Mineralisers, Modifiers and Activators in the Clinkering Process" 9th International Congress on the Chemistry of Cement, vol. 1, New Delhi, 1992, pp. 125–143.

D.B.N. Rao, J.M. Brugan, "Activity and Utilization of Slag in OPC Influenced by Advanced Grinding" *World Cement*, vol. 20, No. 6, Jun. 1989, pp. 205–206.

R. F. Blanks, H.L. Kennedy, "The Manufacture of Portland Cement," *The Technology of Cement and Concrete*, vol. I, 1955, pp. 98–105.

R. Kondo, M. Daimon, M. Asakawa, T. Ito, "Iron Cement Made From Blastfurnace and Converter Slags," Review of the Twenty–Eighth General Meeting—Technical Session, The Cement Association of Japan, 1974, pp. 66–68.

H. Okumura, "Recycling of Iron– and Steelmaking Slags in Japan," First International Conference on Processing Materials for Properties, pp. 803–806. (no date available).

F. Puertas, MT. Blanco–Varela, A. Palomo, T. Vázquez, Reactivity and Burnability of Raw Mixes Made with Crystallized Blastfurnace Slags—Part II, *Zement–Kalk–Gips*, Nr. 12/1988, pp. 628–631.

M. Schmidt, "Cement with Interground Additives," *Zement–Kalk–Gips*, Apr. 1992, vol. 45.

I. Odler, "Improving Energy Efficiency in Portland Clinker Manufacturing," *Cement and Concrete Science & Technology*. vol. I, Part I, 1991, pp. 174–200.

V.K. Gore, S.A. Khadilkar, P.G. Lele, C.H. Page, A.K. Chatterjee, "Conservation of Raw Material Through Use of Industrial Wastes in Cement Manufacture," 9th International Congress on the Chemistry of Cement, vol. II, New Delhi, 1992.

A. Dasgupta, "On Making a Special Cement Clinker Using Indian Blast Furnace Slag as a Raw Material," *Technology*. vol. 12 No. 1, 1975.

R. S. Boynton, Chemistry and Technology of Lime and Limestone, $2^{nd}$ Edition, 1980.

P.P. Gaidzhurov, V.L. Bernshtein, M.R. Zlatokrylov, "Study on the Formation and Properties of Cement Clinker Produced on the Basis of Converter Slags," *Chemistry and Chemical Engineering*, vol. 33, Issue 3, Ivanovo, 1990.

F. Puertas, J. Soria, $M^aT$. Blanco–Varela, T. Vázquez, "Modification on the Tricalcium Aluminate Phase in Cements by Manganese Substitution," *Cement and Concrete Research*, vol. 18, pp. 837–842, 1988.

S.C. Ahluwalla, C.H. Page, "Effect of Low Grade Fuels, Combustible Wastes and Non–Traditional Raw Materials," 9th International Congress on the Chemistry of Cement, vol. 1, New Delhi, 1992, pp. 837–842.

P. Liebl, W. Gerger, "Benefits and Limitations When Using Secondary Materials" Process Technology of Cement Manufacturing, Kongress Verein Deutscher Zementwerke e.V., Dusseldorf, 1993.

M.E. Asim, "Blastfurnace Slag Processing to Blended Cements," *Zement–Kalk–Gips*, No. 12/1992, pp. E311–E317.

F. Puertas, $M^aT$. Blanco–Varela, A. Palomo, T. Vázquez, "Reactivity and Burnability of Rax Mixes Made with Crystallized Blastfurnace Slags—Part I," *Zement–Kalk–Gips*, Nr. 8/1988, pp. 398–402.

Prof. W. Kuredovski, Dr. of Eng., Krystyna Wieja, Mgr. Eng., "Sinterability of Raw Material Compositions Including Blast Furnace Slag," *Cement Lime Gypsum*, Nov.–Dec. 1989.

R. Dogadzhiska, V. Vylkov, I. Vylkova, B. Vylkov, L. Gigova, "Use of Slag From Kremikovtsy Metal Works for the Production of Portland Cement Clinker," Bulgaria. NIISM, VkhTI, Sofia. (no date available).

I.P. Kogan, O.P. Mchedlov–Petrosyants, A.P. Zdorov, N.F. Drepin, "Intensification of the Process of Preparation of Cement Clinker by Roasting Batch That Consists of Independent Starting Physical and Chemical Systems," USSR Academy of Sciences, 1978, vol. 238, No. 2.

N.M. Zhavoronokov, O.P. Mchadlov–Petrosyan, K.P. Kogan, A.I. Zdorov, I.G. Yench, Clinker Preparation with Low Energy Consumption by Roasting Mixtures Containing Non–Ground Slag, $8^{th}$ International Congress on the Chemistry of Cement, USSR Academy of Sciences. Rio de Janeiro, 1986.

J.M. Levert, Y. Riquier, C. Gohy, "Utilizing LD Slag in the Manufacture of Portland Cement," Conference on Slag and Cement with Additives, Belgium, 1981.

V.S. Gorshkov, S.E. Alexandrov, S.I. Ivashchenko, I.V. Gorshkova, "Complex Processing and Use of Metallurgical Slags in Construction Industry," Moscow, Strojizdat Publishers, 1985.

H. Miyairi, A. Suzuki, J. Haruna, "Ceramic Uses of Blast–Furnace Slag," *Nippon Steel Technical Report*, No. 17, Jun. 1981.

R. Konda, M. Daimon, M. Asakawa, Fuel Economized Ferrite Cement Made From Blastfurnace and Converter Slags, Apr. 13–14, 1976.

F.P. Maroto, T.V. Moreno, "Use of Blast–Furnace Slag as Raw Mix in the Obtaining of Cement and the Modification of Its Phases with Manganese Hydration Reactions," Informes de la Construccion vol. 39, Nov./Dec. 1987.

Li Changhua, "The Effect and Principle of Industrial Wastes Used in Wet Rotary Kiln," pp. 636–640. (no date available).

C.C. Solomon, *Annual Report—Slag—Iron and Steel*, U.S Department of the Interior, Bureau of Mines, 1993. pp. 1–15.

J. Beretka, B. de Vito, L. Santoro, N. Sherman, G.L. Valenti, "Hydraulic Behaviour of Calcium Sulfoaluminate–Based Cements Derived from Industrial Process Wastes," *Cement and Concrete Research*, An International Journal, vol. 23, No. 5, 1993.

Broyage, "High Efficiency Vertical Mills For Cement Clinker and Slag," *Ciments, Betons, Platres, Chaux*, N. 806, 1994.

N. Kogan, Dr. O. Mehedlov–Petrossyan, A. Zdorov, N. Drepin, "The Reduction of Specific Heat and Electrical Energy Consumption by the Use of Waste From Metallurgical Processes as Cement Raw Mixture Components," Proceedings of 7th International Congress on Construction Materials and Silicates, 1979.

Academician N.M. Zhavoronkov, A.S. Boldyrev, N.P. Kogan, S.D. Makashev, O.P. Mchedlov–Petrosyan, A.A. Pashchenko, S.A. Fataliev, T. Yu. Shchetkina, "Theoretical Substantiation of the Use of New Types of Raw Material in the Cement Industry," Doklady akademin nauk SSSR, vol. 245, No. 3, 1979, pp. 666–669.

V.D. Barbanyagre, V.M. Shamshurov, T.I. Timoshenko, "Characteristics of the Sintering Process of Cement Mixes," *Belgorod Technological Institute of Construction Materials*, Tsement, No. 2, 1993, pp. 21–24.

J. Geiseler, "Utilization of Steel Works Slags," presented at the Ironworks Day on Nov. 15, 1990 in Duesseldorf, Stahl u. Eisen 111 (1991), No. 1, 133–138.

E.G. Drevitiskii, A.G. Dobrovol'skii, A.A. Korobok, excerpt from "Increasing Operating Efficiency of Rotary Kilns," Moscow, Stroiizdat, 1990, pp. 98–101.

A.P. Vitushkin, V.N. Panyushkina, "Saving Fuel an Energy Resources in Cement Production," Report from an All–Union Seminar, *Tsement*, No. 2, 1988.

A.A. Pachchenko, E.A. Myasnikova, V.V. Takarchuk, "Clinker Formation in Unground Raw Material Mixes," Kiev Polytechnic Institute, *Tsement*, 4:20–21, 1987.

Recommendations on Development of New Processing Operations, Excerpt from *Cement Industry*, Review information No. 1, "Clinker formation in oxide–salt melts," Moscow, 1987, pp. 43–49, 58–60.

Yu. G. Ench, N.P. Kogan, O.P. Mchedlov–Petrosyan, "Sulfate–Resistance Portland Cement Based on Ferruginous Waste Slags," Yuzhgipro Tsement, Source Not Available (No date, available) p 14–15.

"Pulse Technology in Cement Production," Source Not Available (Date Unknown).

Yu.G. Ench, N.P. Kogan, O.P. Mchedlov–Petrosyan, "Physicochemical Processes Occurring During Firing of a Raw Material Charge with Addition of Slag," Yuzhgiprotsement, *Tsement*, No. 3, pp. 9–11, 1984.

N.P. Kogan, A.I. Piven', I.I. Timchenko, V. Ya. Ryazantsev, D.N. Verbitskii, O.N. Zhukova, "Effect of Self–Decomposing Waste Blast Furnace Slag on Firing of Cement Clinker," New Trends in Intensification and Investigation of Clinker Firing and Cement Setting Processes, Transactions of the State All–Union Scientific Research Institute of the Cement Industry, No. 76, Moscow, 1983, pp. 110–115.

R.M. Dzvonkovskii, A.P. Kholodnii, M.M. Korobov, A.P. Osokin, New Energy–Saving Clinker Firing Process (S–Firing), "New Trends in Intensification and Investigation of Clinker Firing and Cement Setting Processes," Transactions of the State All–Union Scientific Research Institute of the Cement Industry, No. 76, Moscow, 1983, pp. 90–96.

M.V. Babich, V.L. Bernshtein, A.I. Zdorov, "Optimization of Composition of Raw Material Mixes for Firing of Clinkers in Kilns of the Dry Method of Production," "New Trends in Intensification and Investigation of Clinker Firing and Cement Setting Processes", Transactions of the State All–Union Scientific Research Institute of the Cement Industry, No. 76, Moscow, 1983, pp. 52–58.

A.I. Zdorov, Ya. Yu Grodzinkskii, S.T. Lobkovskaya, "Use of Industrial Wastes in Cement Production," Yuzhgiprotsement, *Tsement*, 7:9–10, 1983.

V.L. Bernshtein, M.V. Babich, "Use of Metallurgical Wastes in Cement Production," Yuzhgiprotsement, Use of Technogenic Materials in Cement Production, Transactions of the State All–Union Scientific Research Institute of the Cement Industry, Moscow, 1982, pp. 23–29.

Illegible authors & R.I. Timchenko, A. Yu. Turchik, "Intensification of Firing Process by Using Components with Increased Chemical Energy in the Composition of a Raw Mateiral Mix," "New Trends in Intensification and Investigation of Clinker Firing and Cement Settling Processes," Transactions of the State All–Union Scientific Research Institute of the Cement Industry, No. 76, Moscow, 1983, pp. 40–51.

V.A. P'yachev, "Effective Ferruginous Raw Material for Clinker Production," *Tsement*, May 5, 1981.

V.A. P'yachev, V.N. Cherepanova, S.V. Saenko, "Use of Slags From Oxidized Nickel Ores in the Production of Clinker," Kompleksnoe ispol'zovanie mineral'nogo syr'ya, 6:32–36, 1980.

S.A. Sad'kova, E.R. Priev, "Improvement of Proerties of Loess Brick," Samarkand Architectural–Construction Institute, Stroit. Mater., 7:12, 1980.

R. Dogandzhieva, V. Vylkov, I. Vylkova, V. Vylkov, L. Gigova, "Use of Slags from the Kremikovets Integrated Iron and Steel Works in the Production of Portland Cement Clinker," Excerpts from Transactions of the 5th All–Union Scientific–Technical Conference on Chemistry and Technology of Cement, Moscow, 1980, pp. 160–163.

B.V. Volkonskii, L. Ya. Gol'dshtein, S.D. Makashev, "Problems of Use of Technogenic Byproducts and Industrial Wastes in Cement Production," Transactions of the 5th All–Union Scientific–Technical Conference on Chemistry and Technology of Cement, Moscow, 1980, pp. 142–144.

A.S. Saduakasov, D.N. Abishev, V.A. Ashirov, R.Zh. Dzhakupova, K.M. Satova, Zh. K. Abil'daev, "Electrothemophosphorus Slag—Raw Material for Production of Binders and Refractories," Kompleksnoe ispol'zovanie mineral'nogo syr'ya, 1:51–56, 1980.

V.I. Zharko, "Effectiveness of Additional Supply of Blast Furnace Slag to the Kiln," *Tsement*, 11:8, 1978.

V.A. P'yachev, V.N. Cherepanova, Ya. Sh. Shklol'nik, A.B. Zapol'skaya, "Highly Basic Blast Furnace Slag as a Raw Material Component in the Production of Cement Clinker," Slags of Furnace Metallurgy, Transactions of the Ural Scientific Research Institute of Iron and Steel, 25:99–106, 1976.

"Use of Copper–Smelting Slags in Cement Production," Cement Industry, Series 1 (Review Information), No. 1, Moscow, 1981, pp. 3–27.

M. Schmidt, "Cement with interground additives—Capabilities and environmental relief, Part 1," Zement–Kalk–Gips, 1992, pp. 64–69.

M.E. Asim, "Blastfurnace Slag Processing to Blended Cements," Zement–Kalk–Gips, 1992, pp. 519–528.

J. Stark and A. Muller, "International Development Trends in Low–energy Cements," Zement–Kalk–Gips, 1988, pp. 162–165.

S. Sprung, "Reducing Environmental Pollution by Using Secondary Raw Materials," Zement–Kalk–Gips, 1992, pp. 213–220.

G. Blunk and J. Geiseler, "The Use of Steelmaking Slags, Represented by Selected Examples," Stahl u. Eisen 100, Nr. 3, 1980, pp. 118–123.

*Encyclopedia Brittanica* vol. 13 p11–14 (No date available).*

* cited by examiner

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–6 is confirmed.

* * * * *